(12) United States Patent
Laakso et al.

(10) Patent No.: US 8,464,158 B2
(45) Date of Patent: Jun. 11, 2013

(54) METHOD AND ARRANGEMENT FOR SHARING INFORMATION SEARCH RESULTS

(75) Inventors: Terho Laakso, Espoo (FI); Mika Könnölä, Espoo (FI); Pasi Nummisalo, Vantaa (FI); Rami Hänninen, Espoo (FI)

(73) Assignee: Documill Oy, Espoo (FI)

( * ) Notice: Subject to any disclaimer, the term of this patent is extended or adjusted under 35 U.S.C. 154(b) by 919 days.

(21) Appl. No.: 12/269,745

(22) Filed: Nov. 12, 2008

(65) Prior Publication Data

US 2009/0150792 A1 Jun. 11, 2009

(30) Foreign Application Priority Data

Dec. 11, 2007 (FI) .................................. 20075897

(51) Int. Cl.
*G06F 3/048* (2006.01)

(52) U.S. Cl.
USPC ........................................................ 715/738

(58) Field of Classification Search
USPC ........................................................ 715/738
See application file for complete search history.

(56) References Cited

U.S. PATENT DOCUMENTS

| | | | | |
|---|---|---|---|---|
| 6,321,228 | B1 * | 11/2001 | Crandall et al. | 1/1 |
| 7,162,493 | B2 * | 1/2007 | Weiss et al. | 1/1 |
| 7,509,585 | B1 * | 3/2009 | Gauthier et al. | 715/762 |
| 2004/0267700 | A1 * | 12/2004 | Dumais et al. | 707/2 |
| 2006/0277167 | A1 * | 12/2006 | Gross et al. | 707/3 |
| 2007/0070066 | A1 * | 3/2007 | Bakhash | 345/419 |
| 2008/0140779 | A1 * | 6/2008 | Ahn et al. | 709/205 |

* cited by examiner

*Primary Examiner* — Omar Abdul-Ali
*Assistant Examiner* — Anil Bhargava
(74) *Attorney, Agent, or Firm* — Birch, Stewart, Kolasch & Birch, LLP (57) ABSTRACT

The invention relates to a method and an arrangement for bookmarking information search results on page level and sharing these results between other users. The method includes at least: entering a search query; sending the query to a search engine; and receiving a search result having a list of data files matching to the search query. The method comprises at least: paginating the content of the data files retrieved; rendering page previews of the data files; selecting the pages to be previewed; and previewing the matching pages associated with the data files retrieved; then bookmarking selected preview pages and selecting one or multiple of these pages to be shared; and finally sharing selected preview pages.

25 Claims, 9 Drawing Sheets

FIG. 8

METHOD AND ARRANGEMENT FOR SHARING INFORMATION SEARCH RESULTS

FIELD OF THE INVENTION

This invention relates to the field of information search and data file content sharing. In particular, the present invention relates to a method according to claim 1 and an arrangement according to claim 16 to preview, bookmark and share page-level search results obtained from search engine in response to a user query that can be generated automatically or manually.

BACKGROUND OF THE INVENTION

The continued growth and popularity of the Internet and company Intranets and Extranets as sources of information has resulted to information explosion to users. This has lead to a demand from users for finding ways to easily search and share relevant information they are looking for. Typically, when a user is looking for information from Internet on a particular subject he or she will use public search engines such as Google or Yahoo Search. In order to share his or her search findings or topic of interests she or he often uses social bookmark sharing services like del.icio.us or furl.net. In case of company Intranet or Extranet search, the user often uses company's internal search engine and internal social bookmarking services.

The term user in this context can mean a human user who makes manual searches and content bookmarking or a machine-based user that can be for instance a process that makes automatic searches and automatic content bookmarking after an alarm has occurred in an industrial process.

Generally speaking a search engine is a program that performs a search based on user search query (e.g. keyword(s) or phrase) and sends the search results back to the user. These result lists typically include a listing of hyperlinks for the web pages or other documents produced by the search and additional information such as an excerpt of the text on the page, which relates to the keywords entered by the user for the search and the file type of the result document. Techniques, such as Boolean query language, may be used to create a search phrase and limit and narrow down the number of search hits.

In some cases the search listing contains visual presentations (also known as thumbnails) of the web pages, still images and first/multiple frames of the video content. In case of Web (HTML) document thumbnails, the rectangular upper part of HTML pages are rendered into bitmap graphics and resized in order to create visual abstracts of the pages. It is well known to those skilled in the art that rendering means processing a document for visual representation. The rendering engine of the web browser essentially processes format instructions and converts them into graphical elements, determines the layout and calculates the overall appearance of the document. The thumbnail presentation may work fine for the web documents if the content length is sufficiently small, fitting into standard screen size, aspect ratio and resolution. This content is then scaled according to thumbnail dimensions, providing a very high-level preview of the web page.

Social bookmarking is generally understood as a method to store, organize, search, and manage bookmarks of web pages on the Internet with the help of meta-data. Typically in a social bookmarking system users have means to save URL's of the web pages she or he wants to share with other users. These bookmarks can be shared publicly or privately only with specified people or groups. Many social bookmarking services encourage users to organize their bookmarks with informal tags or folders, or a combination of folders and tags. The thumbnail presentation of the web pages described in previous section would improve the user experience of organizing bookmark folders and viewing them.

However, a single thumbnail presentation and conventional URL based bookmarking is not practical for documents containing multiple pages i.e. paginated content such as Microsoft Word, Microsoft PowerPoint or PDF documents. In some cases the same applies with long HTML documents like web blogs, which often contain textual content worth tens of pages when paginated for printing or view-per-page purposes.

In case of searching and sharing multi-page documents visual accuracy and capability to re-produce the original layout characteristics is one of the key features for good user experience. The rendering process and the original document should follow the document specific pagination as closely as possible. The process should produce previews from the original document following the appropriate pagination logic, creating at least one new representation for each page or slide of the document. If the document is a long HTML page it would be beneficial if the process has logic to paginate the content to a printable format. The system should also have capability to bookmark these paginated previews for content sharing purposes.

Paginated document previews help end-users to judge relevancy of the document content during the search activity. These previews also provide a powerful tool for sharing interesting content as a part of the social bookmarking service. They provide instant access to relevant and interesting parts of the document. If the service would also enable the end-users to create, organize and tag shared folders from preview pages one could significantly improve accessibility and discoverability of information content previously hidden within multi-page documents or long HTML pages such as blogs. In addition it would help other users to faster access and use content findings their peers and other subject experts have previously made and defined as valuable, worthy for sharing with others.

SUMMARY OF THE INVENTION

In view of the foregoing and other problems of the conventional information search and sharing methods, it is, therefore, an object of the present invention to provide a method and arrangement for handling, bookmarking and sharing of information search results in a way that helps to reduce time spent on accessing and reviewing relevant shared content. In general the method of the invention is characterized by what is disclosed in claim 1. Correspondingly, the arrangement of the invention is characterized by what is disclosed in claim 16. Other embodiments of the invention are characterized by what is disclosed in the other claims.

According to one aspect of the present invention there is a client-server computing platform including; (a) means for examination of the data file name returned by a search engine, (b) means for identification of the source (URL) from which the data files are available, (c) means for obtaining the data files from the source, (d) means for generating one or more visual presentations for desired data file pages, (e) means for creating and tagging folders from preview pages, (f) means for adding meta-data for preview page folders and (g) means for sharing preview folders with bookmarks.

According to another aspect of the present invention the standard capabilities of a web browser may not support direct access to the data files. The data file access may require the 3$^{rd}$ party manufactured external plug-ins or viewers e.g. PDF viewer, Microsoft PowerPoint Viewer or Microsoft Word Viewer. The present invention provides means for accessing and previewing data file pages with the standard capabilities of a web browser.

According to further features of the invention the data files described in the previous paragraphs contain one or more pages. The invention has means for generating visual presentations of data file pages that may differ in visual dimensions (pixels) but the representations will always follow the pagination logic of the data file or the pagination calculated as part of the content rendering process based on the data file content. A page preview is a result of the data file pagination and the data file content rendering. The rendering process creates individual page preview files of the data file content according to the pagination.

The page previews of a data file may be presented as m by n matrix area below the individual search result provided by the search engine. A larger and readable page presentation may be displayed on the output device when the cursor or pointer is moved or clicked on top of the small page preview. The larger page may also be closed when the cursor or pointer is clicked or moved away from the large page preview displayed on the output device.

According to the further aspect of the innovation, the m by n matrix of the page previews may be used to pick preview pages into folders that can be tagged, bookmarked and shared with other people.

Other objects, advantages and important features of the present invention will become apparent from the following detailed description taken in conjunction with the annexed drawings, which disclose but do not limit preferred embodiments of the invention.

BRIEF DESCRIPTION OF THE DRAWINGS

The accompanying drawings, which are incorporated in, illustrate an embodiment of the present invention. It should be understood, however, that the invention is not limited to precise arrangements and depictions shown in the drawings.

DESCRIPTION OF THE INVENTION

The following detailed description of the invention refers to the accompanying drawings. The same reference numbers in different drawings identifies the same or similar elements. Also, the following detailed description does not limit the invention.

The present invention aims to improve and quicken the user's ability to discover, bookmark and share relevant information from large data files containing several pages. This may be accomplished by creating and possibly caching visual presentations of data file pages for quick content preview. In that respect the invention is a tool that makes the handling, bookmarking and sharing of information and particularly the handling, bookmarking and sharing of search results easier and faster compared to conventional solutions.

The arrangement according to the present invention enhances information discovery and dissemination by displaying differently sized visual presentations of individual data file pages and by enabling bookmarking pages of these visual data file presentations. This provides the user with ability to quickly review and verify the relevancy of the data file content as well as pick and share relevant preview pages from the data file. The user can work with several data files content concurrently because the arrangement provides simultaneously previews from several data files to the output device.

In one embodiment, the server creates visual presentations when a user carries out a content search activity, allowing the user to bookmark relevant pages from data files for sharing purposes. There are server techniques known to those skilled in the art to bookmark a page. A bookmark is an URL to the preview page the preview engine has generated. These links can be grouped into folders and tagged with meta-data. Once the user has marked relevant document pages for sharing, the system may delete visual previews of the original documents. When shared bookmarks are accessed again by the same user, or other users, then the system creates the same document previews again, enabling the end-user to directly access the bookmarked pages. This arrangement is practical if the preview cache size is limited, or preview caching is not allowed for data confidentiality and security reasons.

In another embodiment, the server uses a caching mechanism to store the visual presentations and folder structures with related meta-data of the data files into a cache so that users who later access the same document do not require system to regenerate the visual presentations. The cache may be programmed to store the visual presentations and folder structures with related meta-data for a specific amount of time and then delete the presentations to conserve storage space. The cache may also be programmed to optimize the visual presentations in means of bitmap graphics optimization and a graphics format compression to conserve storage space or converting visual presentation into different scalable graphics formats such as SVG. The cache may also contain meta-data to tag and bookmark visual presentations.

Figure 1:
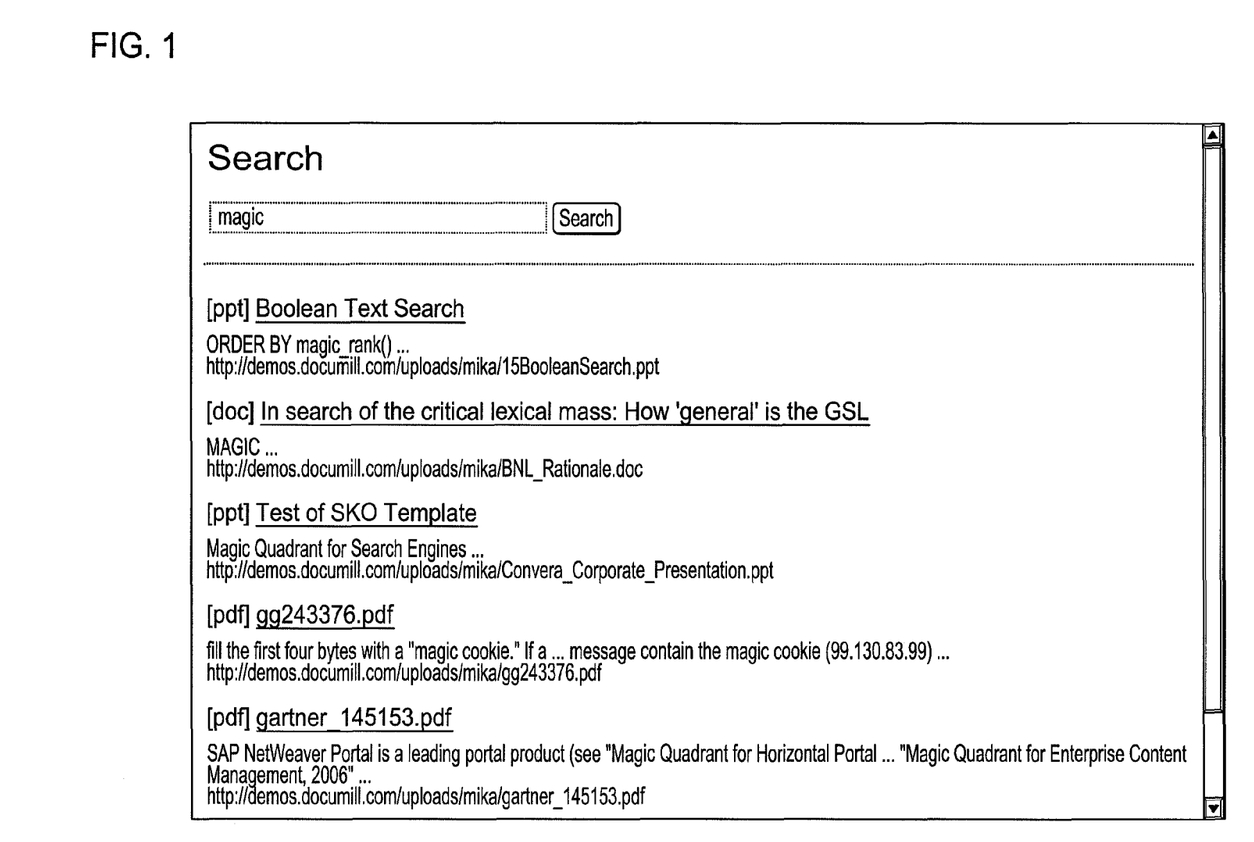
FIG. 1 illustrates a prior art search results listing.
Figure 2:
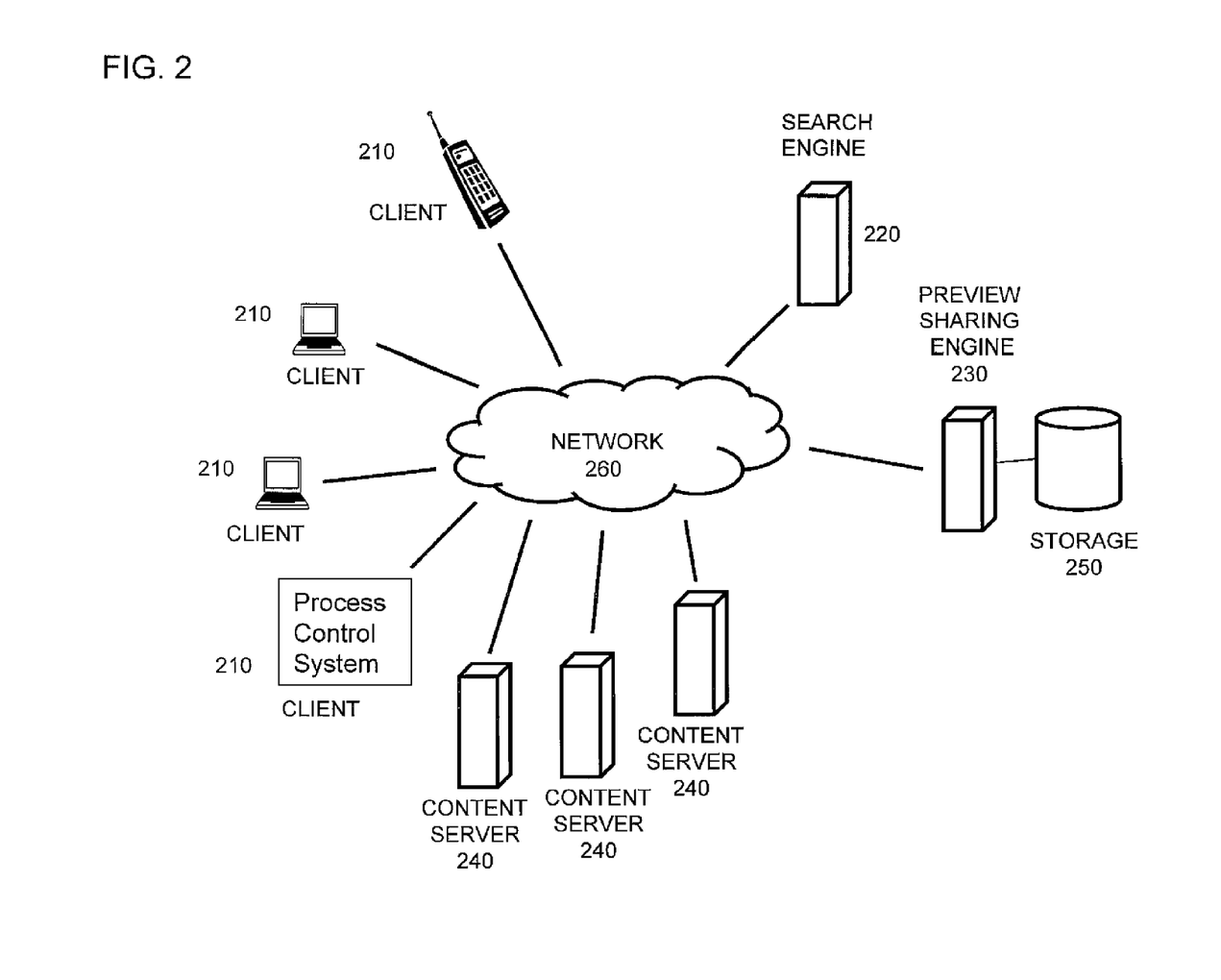
FIG. 2 is an exemplary diagram of a network based search system in which systems and methods consistent with the principles of the invention may be implemented.

FIG. 2 is an exemplary diagram of a network in which arrangements and methods consistent with the principles of the invention may be implemented. Network may include multiple clients 210 connected to multiple servers 220-240 via a network 260. As an example, three clients 210 and five servers 220-240 have been illustrated as connected to a network 260. In practice, there may be more or fewer clients and servers.

The client may be defined as a device, such as a wireless telephone, a personal computer, a personal digital assistant (PDA), a laptop, or another type of computation or communication device or process running on one of these devices, and/or an object executable by one of these devices, or a process or a function running in an industrial process. Servers 220-240 may include server and storage entities that gather, process, search, and cache visual presentations of data file pages and preview folder structures with related meta-data in a manner that is consistent with the principles of the invention.

In an implementation consistent with the principles of the invention, server 220 represents a search engine usable by the clients 210 via the server 230 that acts as a preview sharing engine. Server 220 may find and identify data files and web documents located in the content servers 240, index the data files and web documents, and store information associated with the data files and web documents in a data repository. Server 220 may use other servers or alternative data repositories to store information associated to the data files or web documents that it may have crawled or analyzed from the content servers 240.

Server 230 runs the preview sharing engine to generate and cache previews of the data file pages with associated meta-data into the content storage 250 according to the principles of the invention. The content storage 250 may be part of the preview sharing engine or it could be a separate server entity depending on the infrastructure requirements and deployment.

While servers 220-240 are shown as separate entities, it may be possible for one or more of servers 220-240 to perform one or more of the functions of another one or more of servers 220-240. It may be possible that several servers are clustered to run the search engine, and/or preview sharing engine and/or content server as a single entity. It may also be possible that parts of the search engine, and/or preview sharing engine and/or content server tasks are distributed to several servers. The search engine may be run as a separate service powered by dedicated server machine(s) as well or alternatively as an embedded service, included into some other application/service for providing an application/service specific to internal search functionalities.

Network 260 may include a local area network (LAN), a wireless local area network (WLAN) a wide area network (WAN), a wireless communication network, such as Global System for Mobile communications (GSM), an Intranet, the Internet, or a combination of networks. Clients 210 and servers 220-240 may connect to network 260 via wired, wireless, and/or optical connections.

Figure 2A:
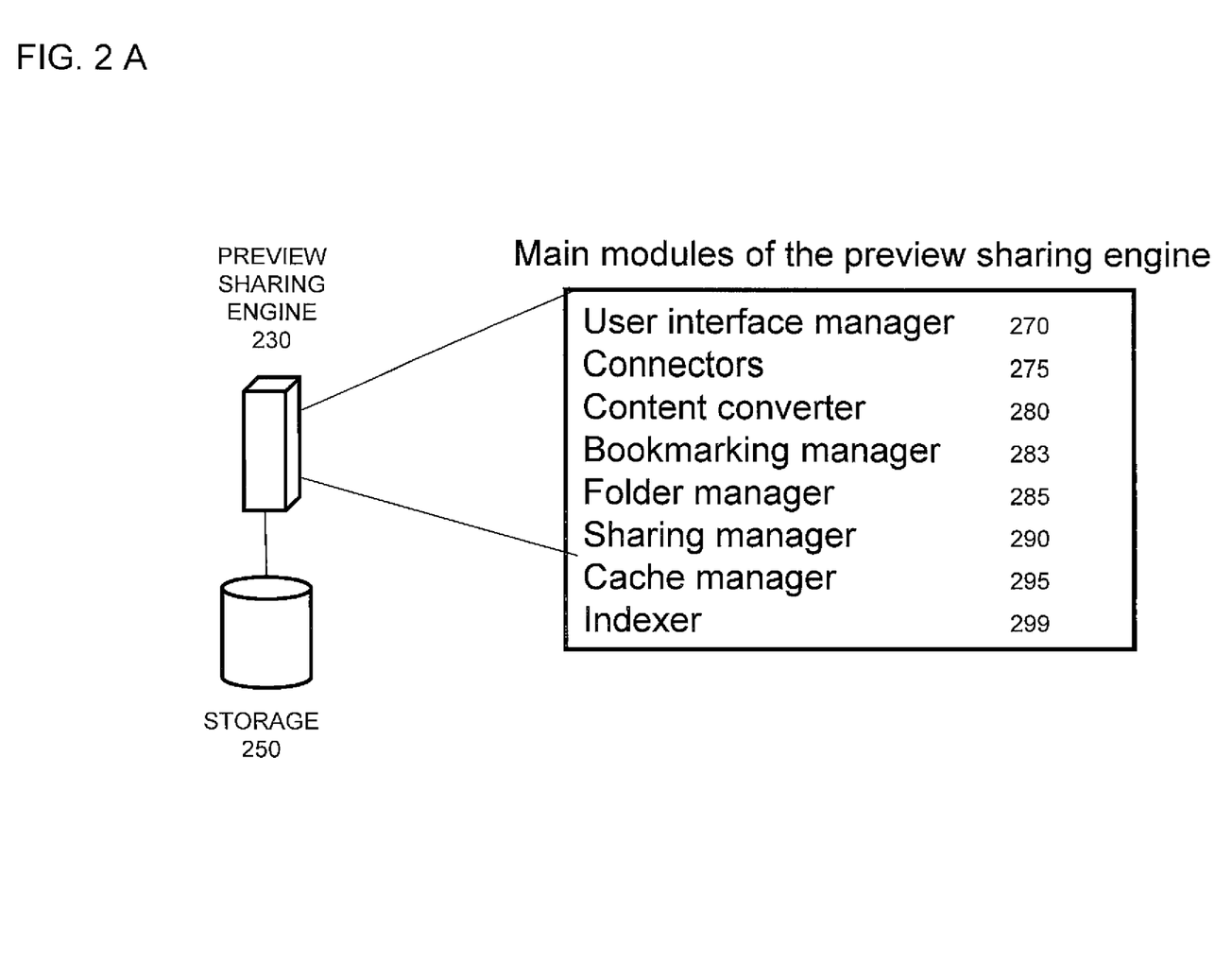
FIG. 2A illustrates main modules of the preview sharing engine.

FIG. 2A describes main modules of the preview sharing engine 230. In an implementation consistent with methods and arrangements of the innovation the preview sharing engine 230 may include at least the following modules: a user interface manager 270, connectors 275, a content converter 280, a folder manager 285, a sharing manager 290 and a cache manager 295.

The interface manager 270 is equipped with means to interact with the user through the client 210, (a) to receive a search query or a file download request, and (b) to provide search results with the data file page previews, and (c) to allow user to pick and bookmark relevant page previews for further sharing, and (d) to arrange and tag the folder content, and (e) to select and view the folder content for end user. The connectors 275 are a set of application program interfaces to connect the preview sharing engine 230 to the other servers 220 and 240. The connectors 275 have means for sending a user search query to the search engine 220 or sending a user file downloading request directly to the content server 240, receiving a search result list from the search engine 220 and downloading the data files from the content servers 240 to the preview sharing engine 230.

The content converter 280 has paginating means for paginating data files content and rendering page previews from the data files. The bookmarking manager 283 has means for selecting and bookmarking preview pages the content converter 280 has generated from the data files. The folder manager 285 has means for creating, editing and deleting preview page folders. The sharing manager 290 has means to share folders privately or publicly. The cache manager 295 has means for storing and retrieving data files page previews and/or page preview folders with associated meta-data into the storage 250. The page indexer 285 has means for indexing data file pages for filtering purposes, and means for searching and selecting matching pages from the data files.

Figure 3:
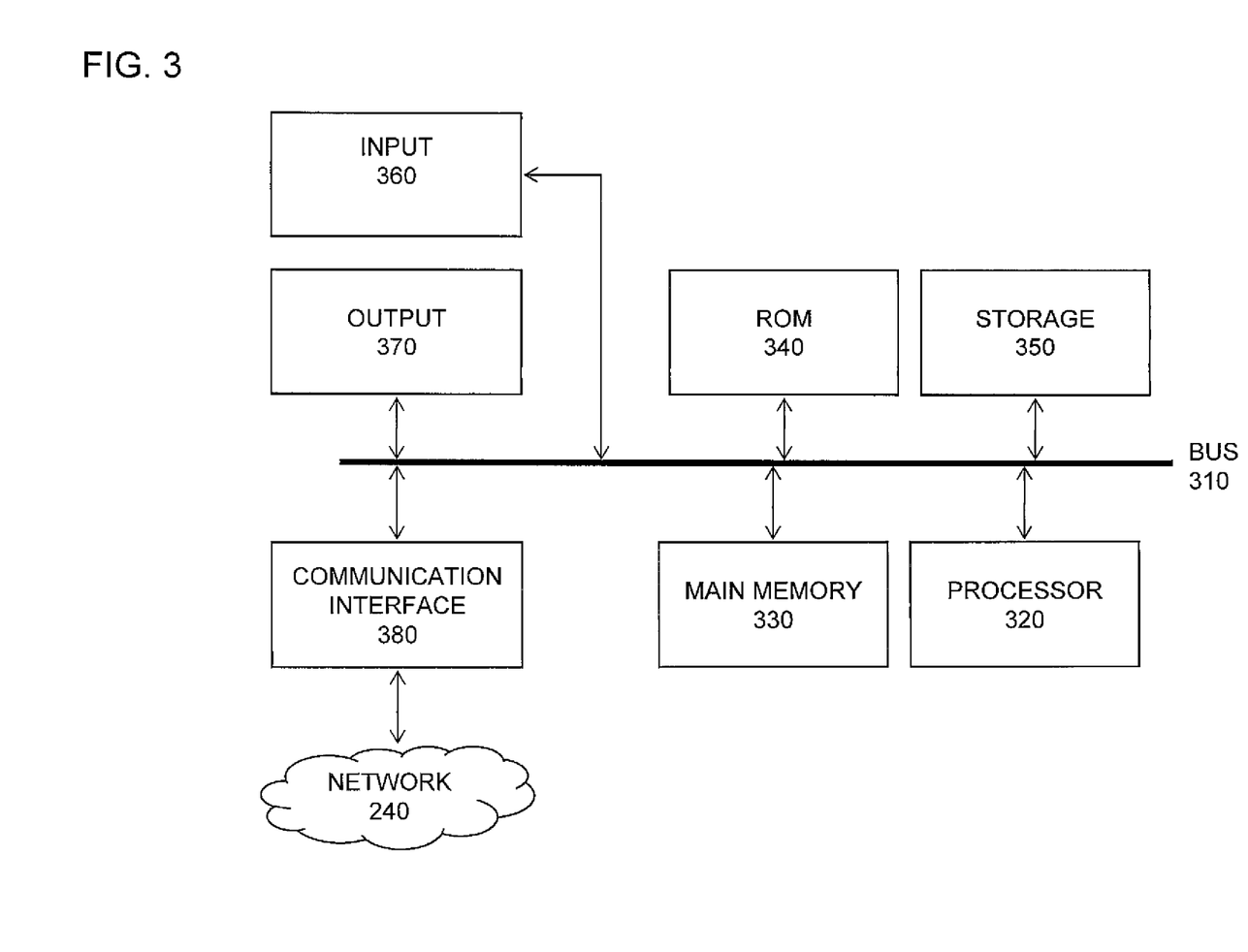
FIG. 3 is an exemplary diagram of a client or server of FIG. 2 according to an implementation consistent with the principles of the invention.

FIG. 3 is an exemplary diagram of a client or server entity (hereinafter called "the client/server entity"), which may correspond to one or more of clients 210 and servers 220-240, according to an implementation consistent with the principles of the invention. The client/server entity may include a bus 310, a processor 320, a main memory 330, a read only memory (ROM) 340, storage medium 350, input means 360, output means 370, and a communication interface 380 to the network 260. The bus 310 may include means or methods that permit communication among the elements of the client/server entity.

The processor 320 may include a conventional processor, microprocessor, or processing logic that interprets and executes instructions. The main memory 330 may include a random access memory (RAM) or another type of dynamic storage device that may store information and instructions for execution by the processor 320. The ROM 340 may include a conventional ROM device or another type of a static storage device that may store static information and instructions for use by the processor 320. The storage medium 350 may be a magnetic, electronic or optical medium, including needed drivers and devices.

The input means 360 may include a conventional mechanism that permits a user to input information to the client/server entity, such as a keyboard, a mouse, a pen, a touch screen, voice recognition and/or biometric mechanisms, etc. The output device 370 may include a conventional mechanism that outputs information to the user, including a display, a printer, a speaker, etc. The communication interface 380 enables the client/server entity to communicate with other devices and/or systems over the network 260. For example, the communication interface 380 may include mechanisms for communicating with another device or system via a network 260.

As it will be described in detail below, the client/server entity described in FIG. 2, consistent with the principles of the invention, has equipped with means to perform certain search-related operations. The client/server entity may perform these operations in response to the processor 320 executing software instructions contained in the computer-readable medium, such as memory 330. A computer-readable medium may be defined as a physical or logical memory device.

The software instructions may be read into the memory 330 from another computer-readable medium, such as a data storage device 350, or from another device via the communication interface 380. The software instructions contained in the memory 330 may cause the processor 320 to perform processes that will be described later. Alternatively, a hardwired circuitry may be used in place of or in combination with software instructions to implement processes consistent with the principles of the invention. Thus, implementations consistent with the principles of the invention are not limited to any specific combination of hardware circuitry and software.

Figure 4:
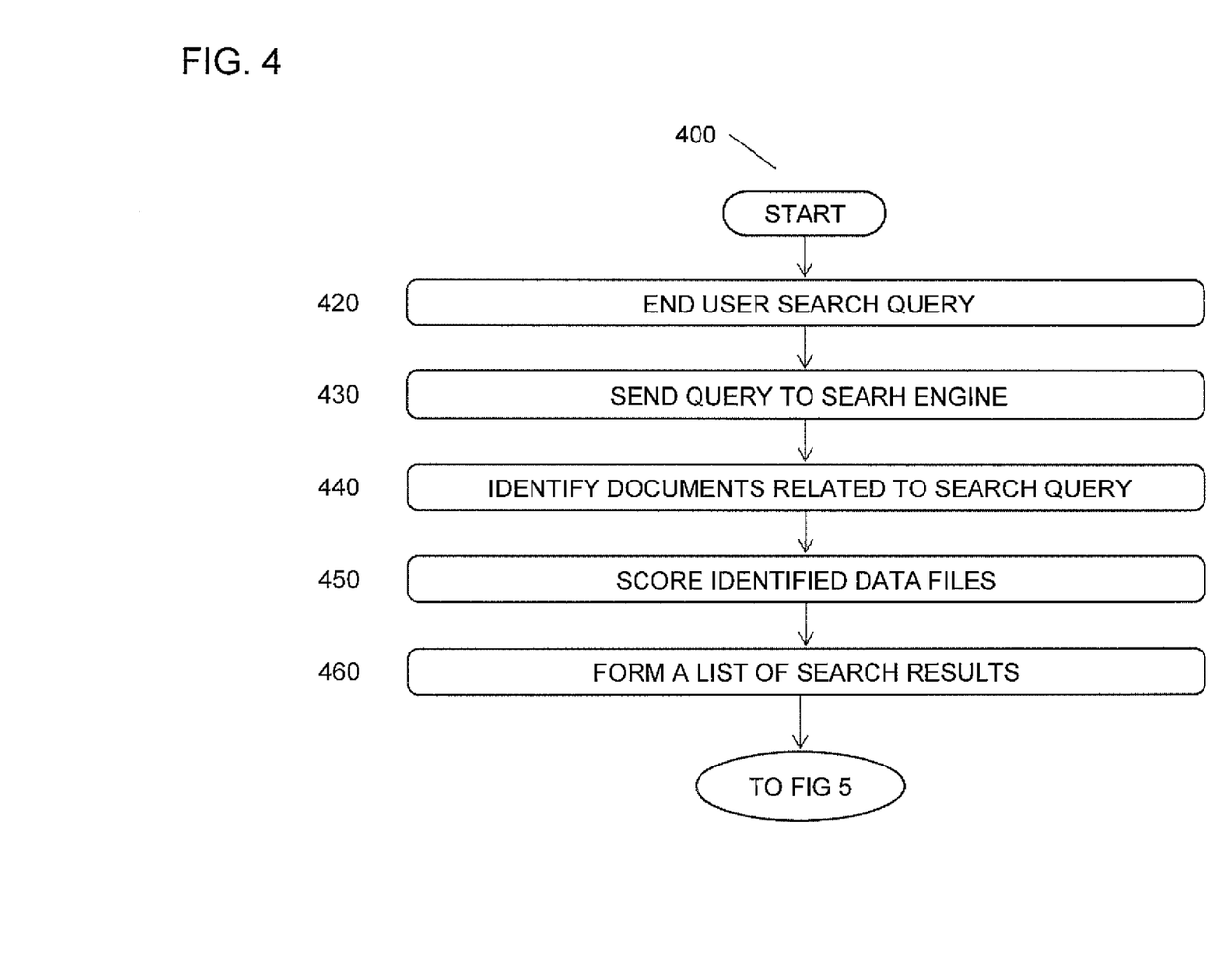
FIG. 4 is a flowchart of exemplary search query and search result from search engine according to an implementation consistent with the principles of the invention.

FIG. 4 describes an exemplary procedure 400 of a search query 420 related to the data files preview according to an implementation consistent with the principles of the invention. The procedure may begin with a user providing a search keyword (s) or phrase and selecting data file type(s) (e.g. pdf, doc, ppt, xsl) as a search query 420. The preview sharing engine 230 receives the search query 430 and sends the search query 430 over the network 260 to the search engine 220. The search engine 220 may be a publicly available service such as Google or Yahoo Search or alternatively the search engine 220 may locate inside a company network accessing internal data repositories or the search engine 220 could be embedded functionality of an application.

The search query 420 is received by the search engine 220 from the preview sharing engine 230. The search engine 220 is used to identify files (e.g. white papers, presentations, research papers, etc.) related to the search query 420. A number of techniques exist for identifying data files related to a search query 440. The techniques are known to those skilled in the art.

The data files identified by the search engine 220 are scored in some known manner in the step 450 of the procedure 400. The score for a data file may be based on an information retrieval (IR) score or a similar relevancy ranking value. Several techniques exist for generating an IR score. For example, one simple method for an IR score for a data file may be generated based on the number of occurrences of the search terms inside data files. Other techniques are known to those skilled in the art.

A list of search results 460 is formed by the search engine 220 based on the identified data files 440 and their scoring 450. In one implementation, the search results list 460 may include information associated with the data files, such as URL of the data file and the data file type and textual abstract of the data file. The search results list 460 may be provided as an HTML document, similar to the search results provided by the conventional search engines 220. Alternatively, the search results list 460 may be provided according to another format agreed upon by the search engine 220 and the preview sharing engine 230, e.g. Extensible Markup Language (XML).

The list of search results 460 formed by the search engine 220 will be provided to the preview sharing engine 230 for further processing.

Figure 5:
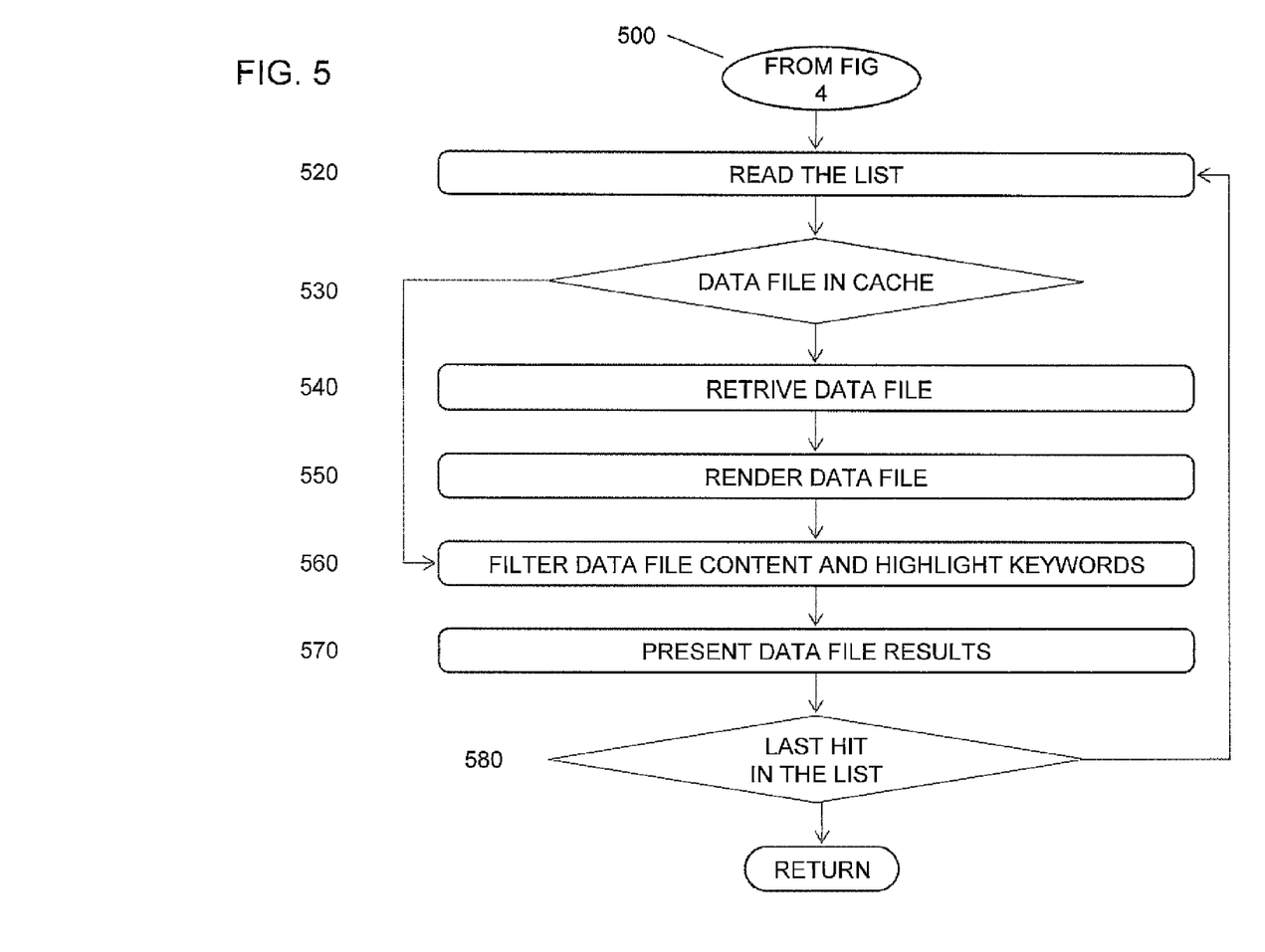
FIG. 5 is a flowchart of exemplary search result preview according to an implementation consistent with the principles of the invention.

FIG. 5 describes an exemplary procedure 500 of the data file preview creation with keyword(s) highlighting. The preview sharing engine 230 has means for running the procedure 500 on the preview sharing engine 230. The list of search results 460 that may be listed according to the scoring 450 is received from the search engine 220 to the preview sharing engine 230. The search result may include search hits range from 1 to as many as the search engine 220 finds from the index. For the sake of preparing convenient output for the end user the entire search result list 460 is divided in K pages containing N hits according to resource constraints. The number of N may be 10 in one embodiment. The step 520 in the procedure 500 running in the preview sharing engine 230 is arranged to read the first hit from the search result list 460 and moving to step 530 to look up if the corresponding data file previews already exists in the storage 250, and if it does, the procedure 500 is fitted to proceed directly to the data file filtering and key word highlighting step 560. In another arrangement step 520 could be replaced by user requesting directly to download a data file from content servers 240. In case the data file is not cached in the storage 250 the preview sharing engine 230 downloads the data file 540 from the content server 240 according to the URL associated to the data file. When the preview sharing engine 230 has retrieved the data file the content converter module 280 paginates and renders the data file page previews 550. The content converter 280 paginates the data file as accurately as possible according to the original appearance of the data file. In one embodiment the original appearance means the visual layout the data file may have when it is opened with the program it was originally produced, e.g. the Microsoft Word document opened with the Microsoft Word program.

The visual layout information coupled with the pagination data is used to create one or more versions of preview pages from the data file. In one embodiment, one version may be a small size preview page and other version a larger, more readable preview of the page. Yet in another embodiment, the size and visual dimensions of different versions of the preview pages can be fixed sizes specified by the user, the output display device or the system, or can be based on the size of the window used to view the data file preview pages.

In one embodiment, the content converter 280 has separating means to separate text and graphical information from the data file pages. The text information may be stored as a HTML content file and graphical information may be stored as a background image file. In one embodiment there may be several background image files and one HTML text content file for a data file page. A preview page may be a combination of a layered HTML text and background image. One result of the data file rendering 550 may be several print sizes of the preview presentations from the data file pages.

Yet in another embodiment, the content converter 280 has means to transcode the data file pages into vector formats such as but not limited to PDF or SVG. The result of the data file rendering 550 may be vector files of the preview pages.

The original downloaded data file and the preview files may be cached and stored into the storage 250 by the cache manager 295 once the data file rendering is completed for further usage to reduce the preview processing time in case the same data file is requested by another search query.

The data file filtering stage 560 is executed by the page indexer module 285 that has means for indexing, searching and selecting those HTML text files and associated image files that match the search query keyword(s) or search phrase provided by the user. In one embodiment the page indexer 285 generates an index of the data file pages. This index is used for searching and selecting the matching pages from the data file. The index of data file pages may also be cached into the storage 250 for further retrieval and usage.

The present data file results phase 570 in procedure 500 uses the user interface manager 270 that has displaying means for displaying the preview(s) of the data file page(s) that contains user search query keyword(s) or phrase to the end user. One data file may contain several page hits. In one embodiment, the matching pages may be grouped together based on a relevancy order or some alternative criteria, and displayed as page level search results. In such embodiment this procedure 500 may be repeated 580 since N data file hits provided by the search engine 220 will be processed by the user interface manager 270 for an output device in the client 210 to preview concurrently multiple data file content. The procedure 500 may be repeated on a user request to display search results on any page between 1 and K. The user may also provide a new search keyword (s) or phrase when the control is returned back to the procedure 400.

Figure 6:
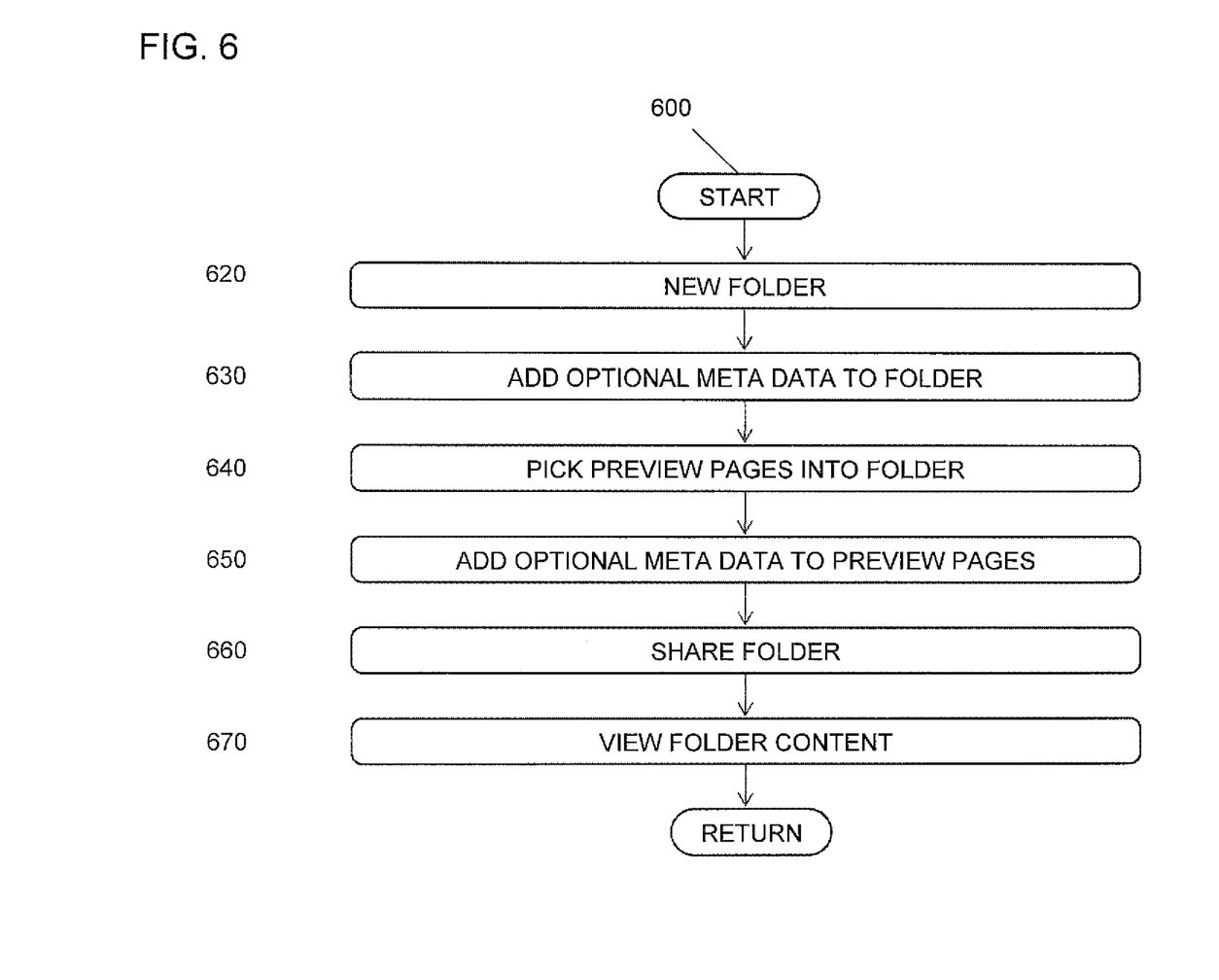
FIG. 6 is a flowchart of the page preview sharing according to an implementation consistent with the principles.

FIG. 6 describes an exemplary procedure 600 of the page preview sharing. The preview sharing engine 230 has means for running the procedure 600 on the preview sharing engine 230. The preview pages that are outputs from procedure 500 and are processed by the user interface manager 270 for an output device in the client 210 to concurrently preview contents of multiply data files are starting points for page preview bookmarking and sharing. The page preview bookmarking process begins by creating and naming a folder with 620. The end user may add relevant optional meta-data 630 to the named folder such as folder category and comments about the folder. The folder manager 285 has also means to rename, copy or delete created folders 620 and to edit folder meta-data 630.

Once the folder 620 is created the end user may pick relevant page previews 640 that are displayed on the output device of the client 210. The user may pick one or multiple page previews from one or multiple different original documents, and store them into the named folder 620. There are several methods available for selecting and picking preview pages into the named folder 620. The techniques are known to those skilled in the art. The end-user may add relevant optional meta-data such as comments to the selected preview pages. The folder manager 285 has means to re-arrange the order of the preview pages inside the folder 620 or to delete them from the folder 620.

To enable sharing of page-level bookmarks, the folder sharing phase 660 of the procedure 600 creates unique bookmark for the folder 620 containing preview pages 640. The folder bookmark is a unique URL that is used for the content sharing purposes. The folder 620 may be defined in this phase to be public of private. The folder sharing phase 660 uses sharing manager 290 that has means to manage user groups for the folder 620 and means to send bookmarks for users.

In one implementation the folder sharing phase 660 may request the content converter 280 to generate one PDF or another scalable vector graphic format file from the preview pages stored into the folder 620 for sharing. The sharing manager 290 has means to send and share the generated file containing all preview pages with associated meta-data from the folder to be shared.

The View folder content 670 phase of the procedure 600 requests the user interface manager 270 to display a folder content with associated meta-data 630 and 650. A folder 620 may contain several page previews form several data files. The preview pages are displayed in the same format they were produced by the content converter 280 in the procedure 500.

Figure 7:
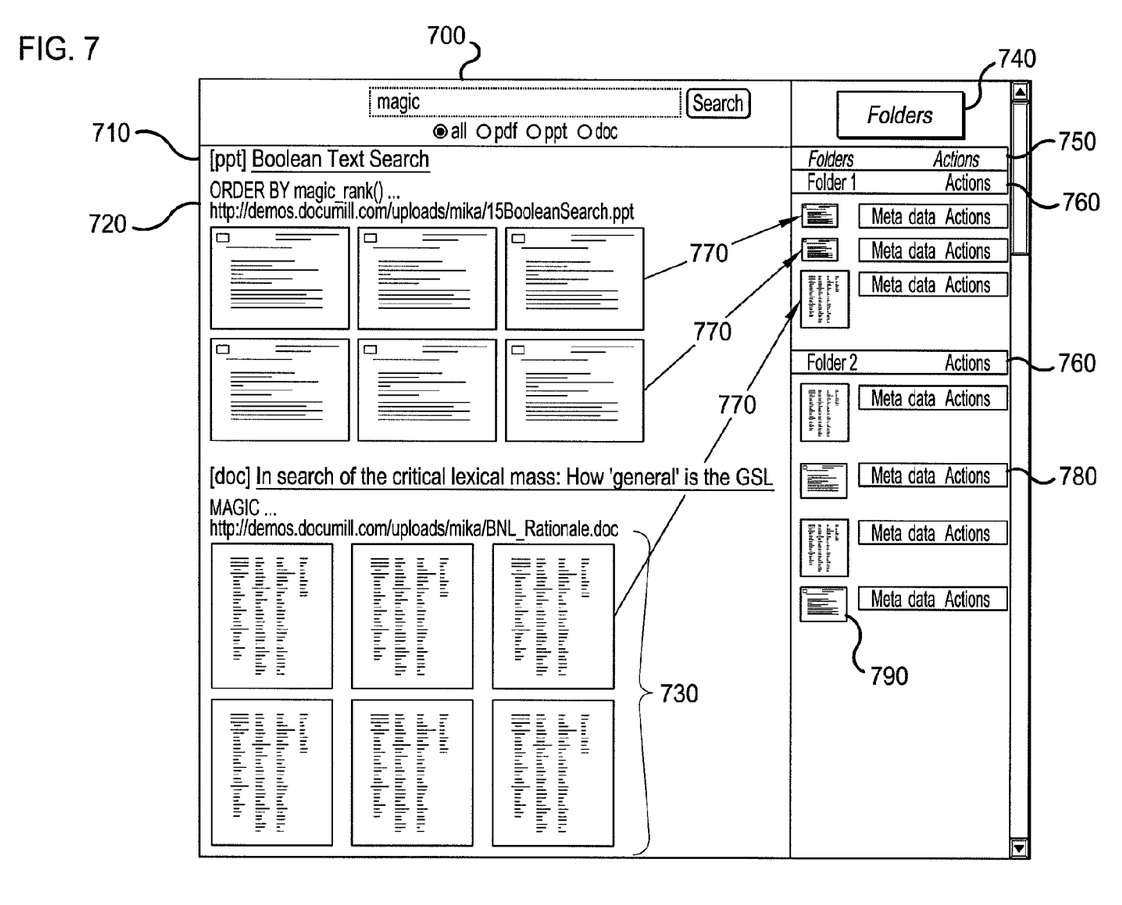
FIG. 7 is an exemplary diagram of the user interface for presenting concurrent page previews and creating preview page folders from search results according to implementation consistent with the principles of the invention.
Figure 8:
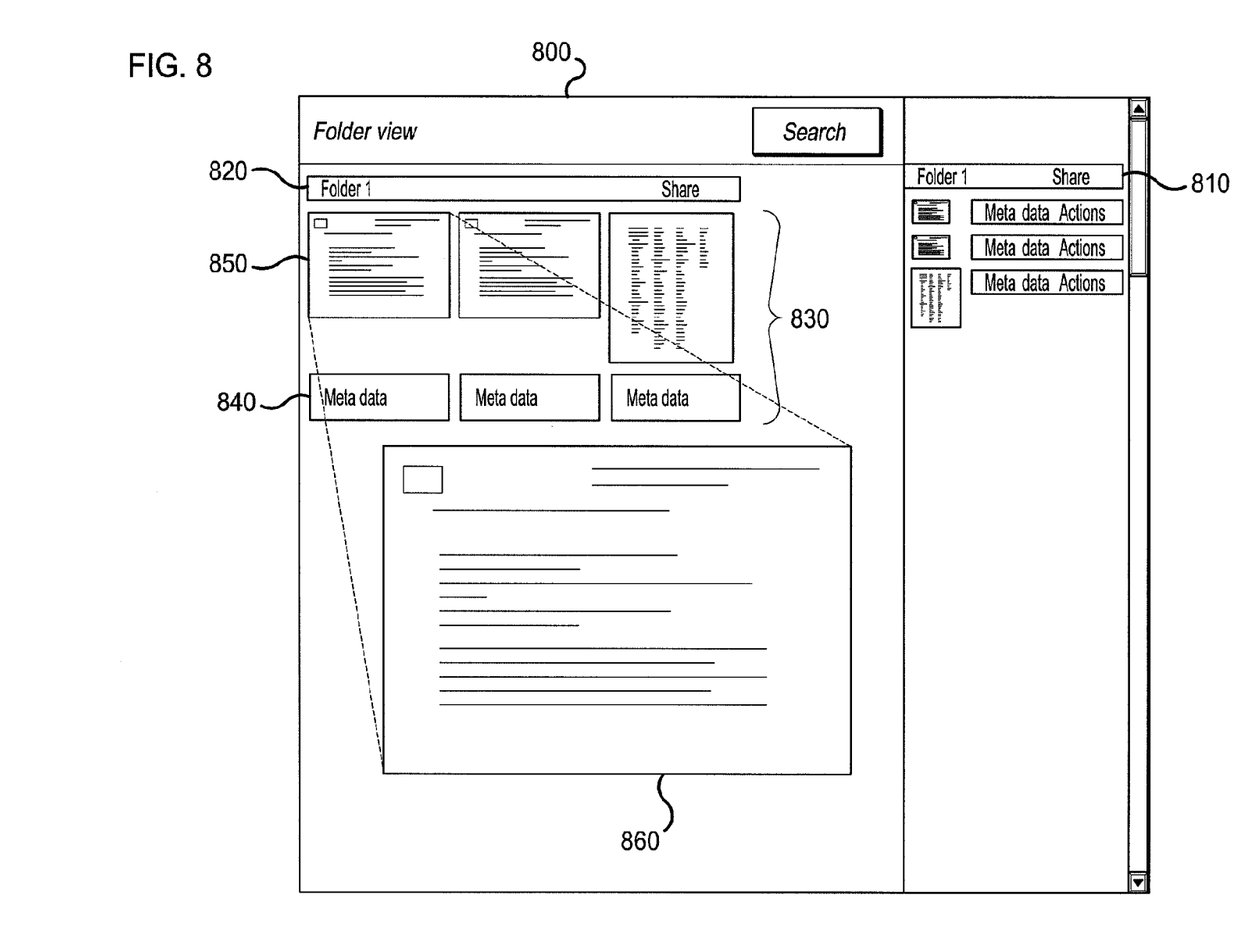
FIG. 8 is an exemplary diagram of the user interface for the preview page sharing according to implementation consistent with the principles of the innovation.

FIGS. 7 and 8 are exemplary diagrams of data file preview output and preview page folder creation implementations in a browser consistent with the principles of the invention. The user interface manager module 270 controls output for the user in the client 210. In one implementation, as shown in FIG. 7 a data file preview output 700 may include the data file type and name as a hyperlink to download the data file 710 and a textual abstract of the data and its URL 720. This data file information may be provided by the search engine 220 or other system, as a part of the search result data. The data file preview may include a set of pages associated with the data file search results 730. The data file pages that match to the user search query are laid out in a preview section in the m by n matrix 730. The matrix 730 and the size of the preview pages may be a fixed size specified by the user or the system, or can be based on the size of the window used to view the data file pages. In one embodiment the m by n may be 3 by 2. Yet in another embodiment, the preview pages may contain highlighting of the keyword(s) or phrase used by the user in the search query. In one implementation a folder view output 740 may include a creation of new folders 750, displaying existing folders 760 containing bookmarked preview pages 790 with associated meta-data 780. The bookmarking manager 283 has means to select and pick individual preview pages 770 from the preview matrix 730 into the folders 760. The user interface manager module 270 may display folders 760 and bookmarked preview pages 790 with associated meta-data 780. The list format enhanced with the small thumbnail presentations 790 of the bookmarked preview pages 770. The folder manager 285 has means to rearrange and/or delete the preview page 780 order inside the folder 780. In addition the folder manager 285 has means for creating, editing, copying, moving and deleting actions for the folders 760, and the preview pages 780 and associated meta-data.

In another implementation of the folder view 800 as shown in FIG. 8, the user has received a bookmark link from the sharing manager 290 that contains URL to the folder 810. The view may include a folder information 820 and an m by n matrix presentation of the preview pages 830. The m by n matrix view 830 may also include meta-data 840 associated to the preview pages.

In one implementation the selected preview page 850 may be zoomed in for better readability. The bigger preview page 860 may be opened when the cursor or the pointer moves on the top of the small size preview page 850 or the small size page 850 is clicked with the cursor or the pointer action. The large preview page 860 may be closed by a pointer click or moving the pointer outside the large page area.

CONCLUSION

The invention must be understood as a tool and method to improve the user's ability to discover, bookmark and share relevant information from large amount of stored data. The methods and arrangements consistent with the principles of the invention will improve information discovery and sharing efficiency with the instant access to the accurate page level data file previews. The invention may be used in the context of existing or new network based data search solutions and services, as well as to discover local data repositories with and within a single or clustered computer system.

The foregoing description of the preferred embodiments of the present invention provides illustration and description, but is not intended to be exhaustive or to limit the invention to the precise form disclosed. Modifications and variations are possible in light of the above teachings or may be acquired from the practice of the invention.

For example, while series of acts have been described with regard to FIGS. 4-6, the order of the acts may be modified in other implementations consistent with the principles of the invention. Further, non-dependent acts may be performed in parallel.

It has been described that data files in the search result list are received from the search engine. In other implementations, however, the data files may be identified in other ways, such as from a directory, category, data repository or another listing of data files. Yet in another implementation the search may be done to local data file repositories located in the client device.

The procedure 500 describes how the content converter 285 creates preview pages from data files. The starting point for creating preview pages is the search result list 460. However in another implementation preview pages may be converted from direct user request asking to download a data file from the content server 240 initiating procedure 500 running in the preview sharing engine 230.

In one implementation the client 210, the search engine 220, the preview sharing engine 230 and the content server 240 may be a single entity accessing local data files in the client 210 using a bus 310 and other possible distributed data files using the network 260. This arrangement is commonly known as local search.

Also, exemplary graphical user interfaces have been described with respect to FIGS. 7 and 8. In other implementations consistent with the principles of the invention, the graphical user interfaces may include more, fewer, or different pieces of information, arranged in different order and visual orientation than what has been defined as exemplary implementation. For instance the m by n matrix mentioned earlier can be smaller or bigger than mentioned 3 by 2 matrix. The characters m and n can be for example any integer numbers between 1 and 20.

It will be apparent to one of ordinary skill in the art that aspects of the invention, as described above, may be implemented in many different forms of software, firmware, and hardware in the implementations illustrated in the annexed figures. Thus, the operation and behavior of the aspects were described without reference to the specific software code—it being understood that one of ordinary skilled in the art would be able to design software and control hardware to implement the aspects based on the description herein.

What is claimed is:

1. A method for bookmarking and sharing of information search results, the method comprising:
   entering a search query;
   sending the query to a search engine;
   receiving a search result having a list of data files each representing a document matching the search query; and
   for each of the data files in the list:
      retrieving the data file;
      paginating the content of the data file into discrete pages;
      generating preview pages each representing a respective discrete page of the retrieved data file; and
      sending the preview pages to a client device which constructs a data file preview which can simultaneously display multiple preview pages generated from the retrieved data file,
   wherein the constructed data file preview is configured to allow an end user of the client device to:
      select preview pages, which are displayed in the data file preview, in order to view higher resolution versions of those preview pages matching the corresponding discrete pages of the retrieved data file,
      bookmark preview pages which are displayed in the data file preview,
      place bookmarked preview pages into bookmark folders, and
      share the bookmark folders with other users.

2. The method of claim 1, wherein the data file preview pages are indexed for the content filtering, and wherein only those preview pages that match the search query according to the results of the content filtering are selected to be displayed.

3. The method of claim 1, wherein at least one or more page presentations of each data file are shown to the user.

4. The method of claim 1, wherein the data file content is paginated according to original layout.

5. The method of claim 1, wherein the data file preview pages are rendered to HTML and image files, or vector files, and the data page preview is compiled from a layered presentation of the HTML content and image content associated to the page or the page preview is compiled from a vector file.

6. The method of claim 1, wherein at least one or more image files are created from each paginated data file pages.

7. The method of claim 1, wherein matching HTML files and associated image files, or matching vector files are selected for the data file preview, and the search query keyword(s) or phrases are highlighted in the matching HTML files or in the matching vector files.

8. The method of claim 1, wherein a search result area is reserved to display the preview pages associated with the data file.

9. The method of claim 1, wherein the data file preview pages are generated in an m by n matrix format, and a user selectable zoom-in to the data file preview pages is provided within the matrix format.

10. The method of claim 1, wherein the data file preview pages are displayed in connection with data file information provided by the search engine.

11. The method of claim 1, wherein an m by n matrix of preview pages are populated essentially immediately when preview data becomes partially available.

12. The method of claim 1, wherein the data file preview pages that are not currently displayed are preloaded in the memory of a preview sharing engine for later viewing.

13. The method of claim 1, wherein preview pages from data files are placed into a bookmark folder created by a folder manager.

14. The method of claim 1, wherein the bookmarked data file preview pages are displayed in connection with folder information and preview page meta-data provided by a folder manager.

15. The method of claim 1, wherein an HTML, PDF or some other vector graphics format file is generated by a content converter from the bookmarked preview pages and associated meta-data of the folder.

16. A system for bookmarking and sharing of information search results, the system comprising:
   one or more client devices each having a processor programmed to provide a user interface;
   a connection to facilitate a connection between the clients and at least one search engine; and
   a preview sharing engine that performs the following:
      receives a search result from the at least one search engine in response to a query sent to the search engine, the search result having a list of data files each representing a document matching the search query, and
      for each of the data files in the list:
         retrieves the data file;
         paginates the content of the data file into discrete pages;
         generates preview pages each representing a respective discrete page of the retrieved data file; and
         sends the preview pages to a corresponding client device which constructs a data file preview which can simultaneously display multiple preview pages generated from the retrieved data file,
      wherein the constructed data file preview is configured to allow an end user of the corresponding client device to:
         select preview pages, which are displayed in the data file preview, in order to view higher resolution versions of those preview pages matching the corresponding discrete pages of the retrieved data file;
         bookmark preview pages which are displayed in the data file preview;
         place bookmarked preview pages into bookmark folders; and
         share the bookmark folders with other users.

17. The system of claim 16, wherein the preview sharing engine comprises: a user interface manager, connectors, a content converter, bookmarking manager, a folder manager, a sharing manager, a cache manager, and an indexer.

18. The system of claim 17, wherein the connectors are equipped to connect the preview sharing engine to the at least one search engine and to content servers, and the connectors have at least means for sending a user search query to the search engine, for receiving the search result lists from the search engine and for downloading the data files from the content servers to the preview sharing engine.

19. The system of claim 17, wherein in connection with the preview sharing engine the content converter paginates data files content and renders page previews from the data files; and the bookmarking manager bookmarks preview pages from data files into folder; and the folder manager has at least means for creating, editing and deleting bookmark folders with meta-data; and adding and editing meta-data to preview pages; and means for deleting and rearranging preview pages inside a bookmark folder.

20. The system of claim 17, wherein the sharing manager is configured to share the created folder privately or publicly.

21. The system of claim 17, wherein the cache manager is configured to store and retrieve folder data, and data files page previews with associated meta-data into a storage; and the page indexer is configured to index the data file pages for filtering purposes, and search and select the matching pages from the data files.

22. The system of claim 17, wherein the user interface has at least a search result list area for displaying a list of search results containing at least one or more data file hits provided by the search engine, and another search result area for displaying preview pages associated with the data file in an m by n matrix format.

23. The system of claim 17, wherein the user interface has at least a folder viewing area for displaying bookmark folder content provided by the folder manager, the folder viewing area displaying preview pages of data files and associated meta-data from a shared folder in an m by n matrix format, and providing user selectable zoom-in to the data file preview pages inside the matrix format.

24. The system of claim 17, wherein the user interface displays the data file preview pages in connection with data file information provided by the at least one search engine in an m by n matrix.

25. The system of claim 17, wherein the user interface is configured to display data file preview pages in a bookmark folder in connection with folder information and data file preview pages meta-data provided by the folder manager, and the bookmark folder has a display area to present page previews with associated meta-data in m by n matrix.

* * * * *